(12) United States Patent
Hildebrand (10) Patent No.: US 7,207,364 B2
(45) Date of Patent: Apr. 24, 2007

(54) RADIAL TIRE WITH TREAD PATTERN HAVING FOUR OR FIVE CIRCUMFERENTIAL RIBS

(75) Inventor: Volker Hildebrand, Charlotte, NC (US)

(73) Assignee: Continental Tire North America, Inc., Charlotte, NC (US)

(*) Notice: Subject to any disclaimer, the term of this patent is extended or adjusted under 35 U.S.C. 154(b) by 285 days.

(21) Appl. No.: 10/784,655

(22) Filed: Feb. 23, 2004

(65) Prior Publication Data

US 2005/0183807 A1  Aug. 25, 2005

(51) Int. Cl.
*B60C 11/04* (2006.01)
*B60C 11/12* (2006.01)

(52) U.S. Cl. ............. 152/209.18; 152/901; 152/DIG. 3

(58) Field of Classification Search ............. 152/209.1, 152/209.18, DIG. 3, 900, 901; D12/582–591
See application file for complete search history.

(56) References Cited

U.S. PATENT DOCUMENTS

| | | | | |
|---|---|---|---|---|
| 4,387,754 A | * | 6/1983 | Mirtain et al. ............... | 152/901 |
| 4,474,223 A | * | 10/1984 | Landers ..................... | 152/209.2 |
| 4,926,919 A | * | 5/1990 | Hopkins et al. ........ | 152/DIG. 3 |
| 5,361,816 A | * | 11/1994 | Hitzky ................... | 152/DIG. 3 |
| 5,421,387 A | * | 6/1995 | Emerson ..................... | 152/900 |
| 6,340,040 B1 | | 1/2002 | Ikeda | |
| D462,652 S | * | 9/2002 | Lopez ........................ | D12/588 |
| 6,619,352 B2 | | 9/2003 | Diensthuber et al. | |
| 6,874,552 B2 | * | 4/2005 | Lopez ................... | 152/DIG. 3 |

FOREIGN PATENT DOCUMENTS

| | | | |
|---|---|---|---|
| DE | 8708747 | * | 10/1987 |
| EP | 681930 | * | 11/1995 |
| JP | 58-177703 | * | 10/1983 |
| JP | 63-159105 | * | 7/1988 |
| JP | 6-55913 | * | 3/1994 |

OTHER PUBLICATIONS

Development Design Map, no date.

* cited by examiner

*Primary Examiner*—Steven D. Maki
(74) *Attorney, Agent, or Firm*—Calfee, Halter & Griswold, LLP (57) ABSTRACT

An improved tread pattern for a pneumatic tire includes four or five circumferential ribs including inner and outer shoulder ribs, each having a set of lateral grooves extending from their respective shoulders toward but not reaching an adjacent circumferential groove, the shoulder ribs also having multiple sipes arranged between adjacent pairs of lateral grooves. The width of at least one shoulder rib is between about 17% and about 19% of the width of the tread, while the land-sea surface area ratio defined by the tread is about 4–8% larger than the void volume ratio defined by the tread.

33 Claims, 6 Drawing Sheets

RADIAL TIRE WITH TREAD PATTERN HAVING FOUR OR FIVE CIRCUMFERENTIAL RIBS

FIELD OF INVENTION

The present invention relates to pneumatic vehicle tires and in particular to improved tread patterns for such tires.

BACKGROUND

The tread pattern of a pneumatic vehicle tire, i.e., the pattern of grooves and sipes defined in the tread of the tire, plays a large role in the tire's overall performance. Although many tread designs have already been developed, there is always a need for new tread designs which foster improved traction on dry roads as well as on slippery roads due to rain and snow.

SUMMARY OF THE INVENTION

In accordance with the present invention, it has been found that a tread design having shoulder ribs of a particular width and a land-sea area ratio which is about 4–8% greater than its void volume ratio provides a tire exhibiting improved traction both on dry and slippery surfaces.

Accordingly, the present invention provides an improved pneumatic tire whose tread pattern has four or five circumferential ribs including inner and outer shoulder ribs, each having a set of lateral grooves extending from their respective shoulders toward but not reaching an adjacent circumferential groove, the shoulder ribs also having multiple sipes arranged between adjacent pairs of lateral grooves, wherein to width of at least one shoulder rib is between about 17% and about 19% of the width of the tread, and further wherein the land-sea surface area ratio defined by the tread is about 4–8% larger than the void volume ratio defined by the tread.

BRIEF DESCRIPTION OF THE DRAWINGS

The present invention may be more readily understood by reference to the following drawings wherein:

FIG. 6 is a repeat of FIG. 2, while

DETAILED DESCRIPTION

Figure 1:
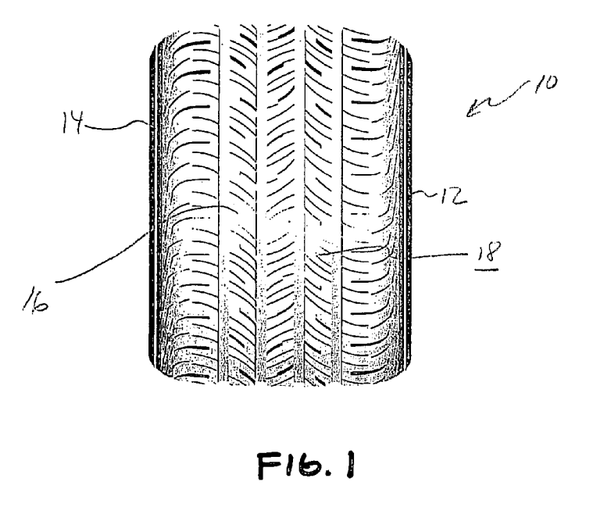
FIG. 1 is a front view of the inventive tire illustrating its tread pattern.
Figure 1A:
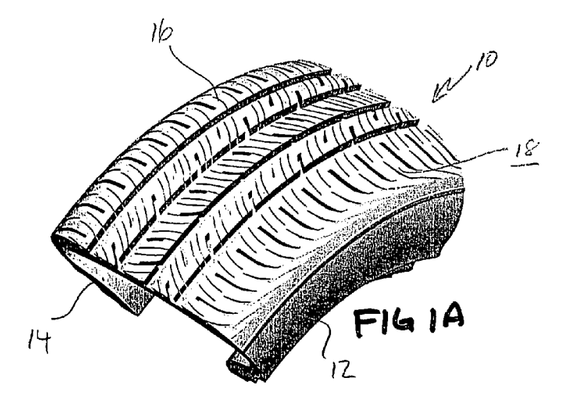
FIG. 1A is a perspective view of a partial section of the tire of FIG. 1.

The inventive pneumatic tire, which is generally shown at 10 in FIGS. 1 and 1A, is formed from inner side wall 12, outer side wall 14 and tread 16 extending therebetween. In this context, "inner" and "outer" are used merely for ease of description, it being understood that tire 10 can be mounted on a vehicle so that either inner side wall 12 or outer side wall 14 faces the vehicle's interior. Normally the width of tread 16, which is the distance TW between shoulders 40 and 48 as shown in FIG. 2, will be about 80–90% of the overall nominal width of the tire, in accordance with well-known design criteria.

Figure 2:
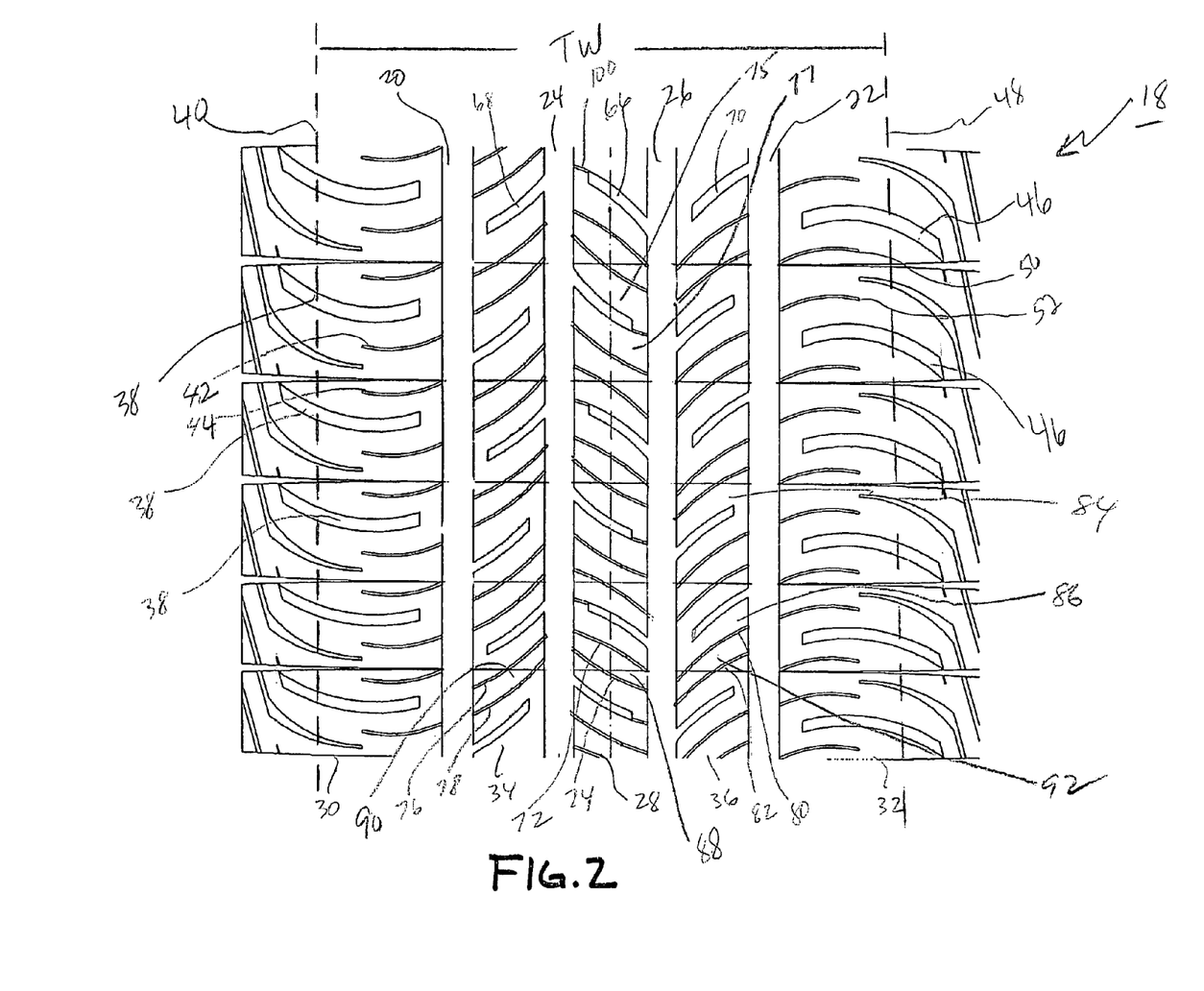
FIG. 2 is a plan view illustrating the tread pattern of the tire of FIGS. 1 and 1A.

Referring to FIG. 2, the tread pattern 18 defined by tread 16 is composed of inner circumferential groove 20, outer circumferential groove 22 and intermediate circumferential grooves 24 and 26 therebetween. These circumferential grooves divide tread 16 into five circumferential tread ribs including central rib 28, inner shoulder rib 30, outer shoulder rib 32 and intermediate ribs 34 and 36 between central rib 28 and inner and outer shoulder ribs 30 and 32, respectively.

The width of inner shoulder rib 30 or outer shoulder rib 32, and preferably both, should be about 34–38% of the half-width of tread 16 when determined under standard conditions. In this regard, see U.S. Pat. No. 6,340,040 B1 to Ikeda, which in col. 2, lines 19–43, discusses measuring tread width and the like under standard conditions. The disclosure of this patent, excluding col. 2, lines 36–37, which are specific to the invention of that patent, is incorporated herein by reference. Alternatively, the width of one or both of these shoulder ribs may be about 35–37% of this half-width. This means that the width of inner shoulder rib 30 or outer should rib 32, and preferably both, should be about 17–19% and even 17.5–18.5%, of the width of tread 16. These widths can be determined by measuring the tire in question directly or by generating a full size tire "footprint" by inking the tread of the tire, rolling the tire over a piece of paper or the like to produce a "footprint" and then measuring the footprint.

As shown in FIG. 2, inner shoulder rib 30 defines a set of inner lateral grooves 38 which extend from the edge of shoulder 40 of tread 16 toward, but not all the way to, inner circumferential groove 20. In addition, shoulder rib 30 also defines multiple sipes 42 and 44 between adjacent pairs of inner lateral grooves 38 which extend all the way to inner circumferential groove 20. In the same way, outer shoulder rib 32 defines a set of outer lateral grooves 46 which extend from shoulder 48 of tread 16 toward, but not all the way to, outer circumferential groove 22. Similarly, outer shoulder rib 32 also defines multiple sipes 50 and 52 between adjacent pairs of outer lateral grooves 46 which extend all the way to outer circumferential groove 22. In the particular embodiment shown, inner lateral grooves 38 and sipes 42 and 44 in inner shoulder rib 30 (and outer lateral grooves 46 and sipes 50 and 52 in outer shoulder rib 32) are spaced such that the distance between inner lateral groove 38 and sipe 42 versus the distance between sipes 42 and 44 versus the distance between sipe 44 and the adjacent inner lateral groove 38 are in a ratio of 25/50/25 to 35/30/35. As can be seen from FIG. 2, no lateral groove in shoulder ribs 30 and 32 reaches circumferential grooves 20 and 22, respectively, As can also be seen in FIG. 2, the circumferential groves are substantially straight grooves having substantially straight edges.

Referring again to FIG. 2, intermediate ribs 34 and 36 also define respective sets of lateral grooves 68 and 70, which preferably extend from the circumferential groove on one side of the rib toward but not all the way to the circumferential groove on the other side of the rib. In addition, intermediate rib 34 defines one or more sipes 76 and 78 between adjacent pairs of lateral grooves 68 which extend all the way between outer circumferential groove 20 and intermediate circumferential groove 24. Likewise, intermediate rib 36 defines one or more sipes 80 and 82 between adjacent pairs of lateral grooves 70 which extend all the way between outer circumferential groove 22 and intermediate circumferential groove 26. Thus, adjacent lateral grooves in combination with the associated sipes in one or both of ribs 34 and 36 define U-shaped rib sections 84 and 86 which face in opposite directions. In this context, "opposite directions" means, for example, that U-shaped rib section 84 faces intermediate circumferential groove 26, while U-shaped rib section 86 faces outer circumferential groove 22.

Note, also, that in the particular embodiment shown in FIGS. 1, 1A and 2, a pair of sipes is included between each adjacent lateral groove in intermediate ribs 34 and 36, thereby defining I-shaped rib sections between adjacent lateral grooves. Thus, for example, sipes 76 and 78 define I-shaped rib section 90 in intermediate rib 34, while sipes 80 and 82 define I-shaped rib section 92 in intermediate rib 36. As can be seen from these figures, adjacent sipes are essentially parallel, whereby the I-shaped rib sections defined thereby have an essentially constant width and essentially the same configuration form I-shaped rib section to I-shaped rib section.

Figure 3:
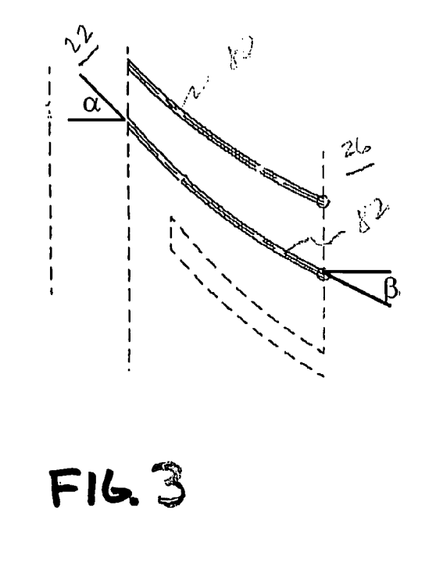
FIG. 3 is a drawing illustrating particular design features of some of the sipes in the tread pattern illustrated in FIG. 2.

As further shown in FIG. 2, the sipes in intermediate ribs 34 and 36 are not only curved but also arranged at an acute angle with respect to the axial direction of the tire. This is illustrated in FIG. 3, which shows that sipes 80 and 82, for example, are not only curved but in addition are arranged so that one end of the sipe intersects outer circumferential groove 22 at an acute angle α while the other end of the sipe intersects inner circumferential groove 26 at an acute angle β. Especially interesting tires are those in which angle α is about 40–50°, more particularly about 45°, and further in which angle β is about 20–30°, more particularly about 25°. Tires in which the radius of curvature of these sipes is about 40 mm to about 120 mm, particularly about 90 mm, are also of special interest.

FIG. 2 also illustrates the structure of central rib 28 of tread pattern 18. Like intermediate ribs 34 and 36, central rib 28 also defines a set of lateral grooves 66 which preferably extend between the circumferential groove on one side of the rib toward but not all the way to the circumferential groove on the other side of the rib, with alternating lateral grooves communicating with opposite circumferential grooves. Thus, lateral groove 66 as shown in FIG. 2 communicates with intermediate circumferential groove 26 but not circumferential groove 24, while the next adjacent lateral grooves on each side of lateral groove 66 communicate with intermediate circumferential groove 24 but not circumferential groove 26. In addition, like intermediate ribs 34 and 36, central rib 28 also defines one or more sipes 72 and 74 between adjacent pairs of lateral grooves 66 which extend all the way between intermediate circumferential grooves 24 and 26.

Central rib 28, however, differs from intermediate ribs 34 and 36 in that an additional short sipe 100 is provided in central rib 28 to connect the shortened end of lateral groove 66, i.e., the end of lateral groove 66 extending toward but not communicating with inner circumferential groove 24, with this circumferential groove. Similar sipes are provided to connect the shortened end of all of the other lateral grooves in central rib 28 with inner circumferential grooves 24 and 26, as the case may be. Thus, rather than defining U-shaped rib sections, lateral grooves 66 in combination with sipes 72, 74 and 100 in central rib 28 define L-shaped rib sections 75 and associated I-shaped rib sections 77.

Central rib 28 differs from intermediate ribs 34 and 36 additionally in that sipes 72 and 74, rather than being essentially parallel, curve in a concave manner with respect to one another. As a result, I-shaped rib section 88 between these sipes is larger in its center than at its top and bottom. At the same time, the sipes defining the next adjacent I-shaped rib section on both sides of I-shaped rib section 88 curve in a convex manner with respect to one another. As a result, the I-shaped rib sections defined by these sipes are smaller in their centers than at their tops and bottoms. Moreover, as further shown in this figure, these concave and convex I-shaped rib sections alternate with one another around the circumference of the tire.

These additional design features are optional in that central rib 28 can be designed to have the same configuration as intermediate ribs 34 and 36, if desired. Indeed, central rib 28 can be totally eliminated, if desired, as further discussed below in connection with FIGS. 7 and 7A.

In any event, sipes 72 and 74 in central rib 28, like sipes 76, 78, 80 and 82 in intermediate ribs 34 and 36, are also preferably curved as well as arranged at acute angles α and β with respect to the axial direction of the tire. See, FIG. 3. Moreover, as in the case of sipes 76, 78, 80 and 82, angle α in connection with sipes 72 and 74 is also typically about 40–50°, more particularly about 45° while angle β is typically about 20–30°, preferably 25°. Tires in which the radius of curvature of sipes 72 and 74 is about 40 mm to about 120 mm, particularly about 90 mm, are also of special interest.

Figure 4:
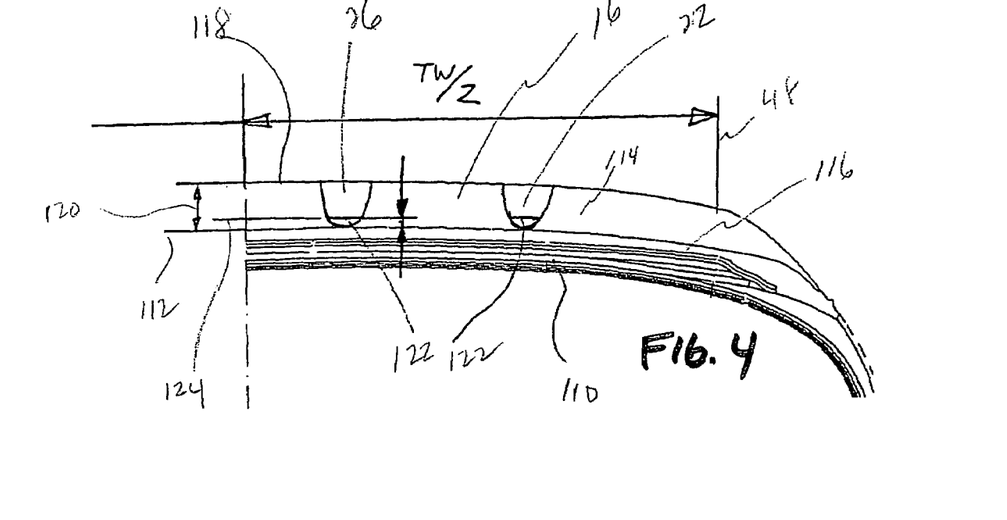
FIGS. 4, 4A and 4B are schematic representations of the thickness of the tread of the tire of FIG. 1
Figure 4A:
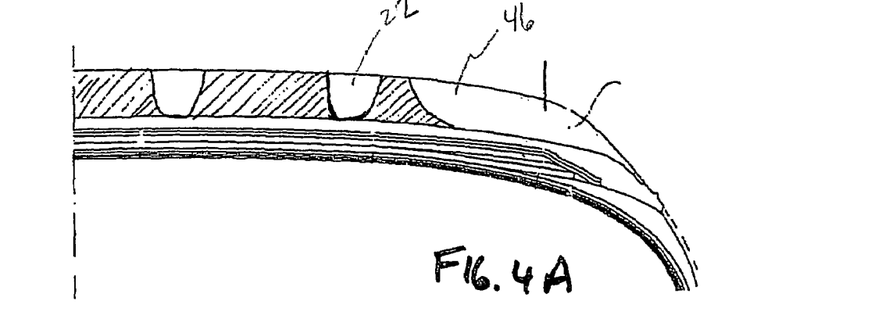
Figure 4B:
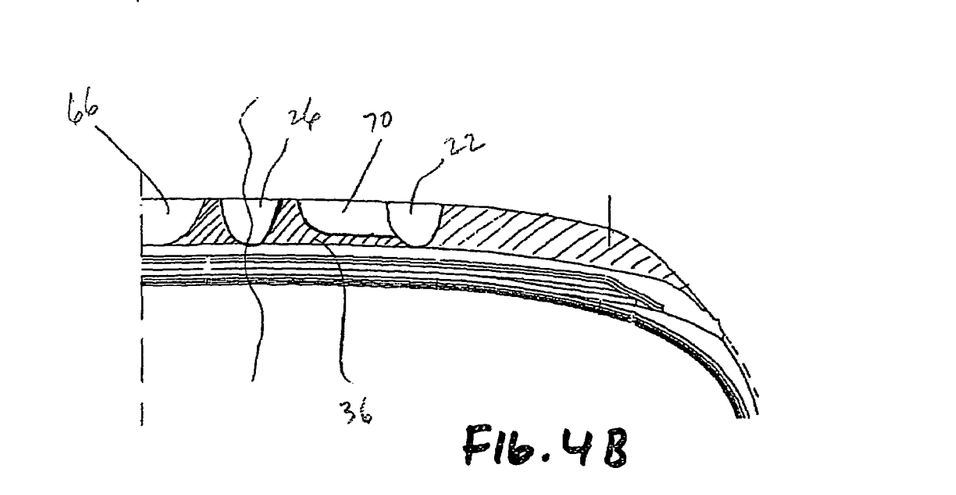

FIGS. 4, 4A and 4B illustrate the thickness of the tread of the tire of FIGS. 1, 1A and 2. Like a conventional pneumatic tire, tire 10 includes a carcass 110 composed of a number of plies of tire cord and fabric. Tread 16 is mounted on carcass 110 and can be regarded as being separated by an imaginary plane 112 into an upper portion 114 and a lower portion or "undertread gauge" 116. Upper portion 114 extends from the outer circumferential surface 118 of the tire to the bottom of circumferential grooves 22 and 26 and thereby defines a "non-skid depth" of tread 16, which is represented by arrow 120 in FIG. 4.

Current tread depth legislation requires that car tires must have a minimum of 1.6 mm of tread above undertread gauge 116 in a continuous band throughout the central ¾ of the tread width and over whole circumference of the tire. To help determine when this tread depth is near, most tires including the inventive tires include tread wear indicators 122 in the form of small projections in the grooves of the tread. These projections extend above undertread gauge 116 and thereby identify a "tread wear indicator height" 124 which is above the bottoms of circumferential grooves 22 and 26.

In accordance with the present invention, lateral grooves 66 in central rib 28 and lateral grooves 68 and 70 in intermediate ribs 34 and 36 may be deeper than in comparable tires. Thus, grooves 68 and 70 may extend to a depth that is at or below one-half of non-skid depth 120, or to a depth that is at or below tread wear indicator depth 124, or even all the way down to non-skid depth 120. This is illustrated in FIG. 4B which shows lateral groove 70 in intermediate rib 36 extending down to the tread wear indicator depth 124 of tread 16, while lateral groove 66 in central rib 28 extends down to non-skid depth 120 of the tread. As illustrated in FIG. 4A, lateral grooves 38 in inner shoulder rib 30 and lateral grooves 46 in outer shoulder rib 32 preferably extend all the way to the non-skid depth of the tread.

As in other pneumatic tires, tread 16 of tire 10 defines a void volume ratio, which is a measure of the volume of open space in a given volume of tread above the bottoms of circumferential grooves 22 and 26, which is represented by section line 112 in FIG. 4. Similarly, tread 16 also defines a "land-sea surface area ratio," which is a measure of the surface area of the outside surface 118 of the tread which is occupied by grooves and sipes relative to the entire surface area of to tread. Normally, the land sea area ratio defined by tread 16 of tire 10 will be about 4–8% larger than its void volume ratio. For example, if the void volume ratio is 26% (i.e., if 26% of the volume between section line 112 and outside surface 118 of tread 16 is open space), then the land-sea area ratio will be about 30–34%. In the particular embodiment illustrated in FIGS. 1, 1A and 2, tread 16 defines a void volume ratio of about 26.3±1.0%, more especially about 26.3±0.5%, and a land-sea surface area ratio of about 32.0±1.0%, more especially about 32.0±0.5%. Tires in which 62 to 70%, and in particular about 67%, of the "sea area" is due to the circumferential grooves of the tread are especially interesting. In this context, "sea area" means the surface area of the tread defined by grooves and sipes.

Another optional feature of the inventive tire is that the lateral grooves, sipes and tread sections defining tread pattern 18 can be arranged in repeating groups or "pitches" of different circumferential lengths for reducing rolling noise of the tire. For example, in a tire having an outside diameter of 690 mm or more, the lateral grooves, sipes and tread sections defining the tread design of FIGS. 1, 1A and 2 can be arranged in 66–70 repeating pitches having at least three different circumferential lengths for reducing rolling noise of the tire. For tires having outside diameters of 620–690 mm, the tread pattern of FIGS. 1, 1A and 2 can conveniently be arranged into 66 of these pitches.

As indicated above, the inventive tire has been designed to exhibit improved traction on both dry road surfaces as well as road surfaces made slippery by rain or snow. Improved dry traction is due to a number of design features including the width of shoulder ribs 30 and 32. In addition, the ability of U-shaped rib sections in the intermediate ribs and corresponding L-shaped rib sections 75 and I-shaped rib sections 77 in central rib 28 to "interlock" with their adjacent I-shaped rib sections because sipes 72, 74, 76, 78, 80 and 82 are curved in configuration also contributes to this result. The void volume ratio and land sea area ratio of the tread in the particular tire shown also contribute, as does the low pitch number.

Similarly, improved traction in rain or snow is due, among other things, to the depth of lateral grooves 66, 68 and 70, which provides rib flexibility and larger lateral gripping edges on snow, both when the tire is new as well as after it is worn. The particular relative spacing between the lateral grooves and the sipes in the shoulder ribs also contributes to this result. Similarly, the use of curved sipes arranged at acute angles, especially in the central and two intermediate ribs, also contributes to this result. The void volume ratio and land sea area ratio of the tire in the particular embodiment shown also contribute to this result, as they promote greater water dispersion and improved "self-cleaning" in the snow.

In particular, the enhanced traction of the inventive tire is attributable among other things to a balance between the sipes, grooves and amount of rubber in its tread, which is in turn is reflected in the arrangement of sipes and lateral grooves in the tread, the relative ratio of the void volume ratio to the land-sea area ratio in the tread, and the total number of pitches in the tread.

Figure 5:
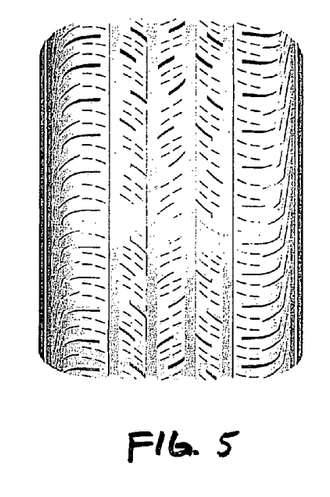
FIGS. 5 and 5A are views similar to FIGS. 1 and 1A illustrating the tread pattern of the tire of these figures when 50% worn.
Figure 5A:
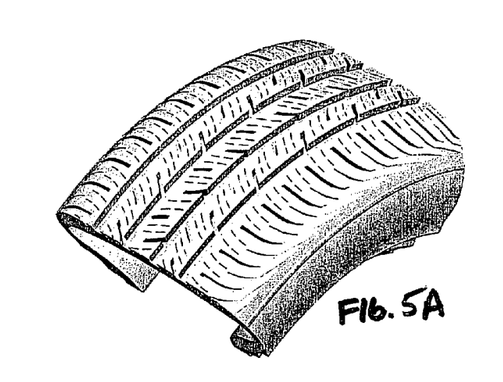

Still another important feature of the inventive tire is that it maintains its appearance after substantial tread wear. This is shown in FIGS. 5 and 5A, which illustrate the appearance of the tire of FIGS. 1 and 1A after 50% of tread 16 has been worn away. As can be seen by comparing these figures, the appearance of tread 16 when so worn is almost identical to that of this tread when new, the only difference being that some of the sipes are divided in two, since they are designed with small projections in their central sections for pattern stability.

Figure 6:
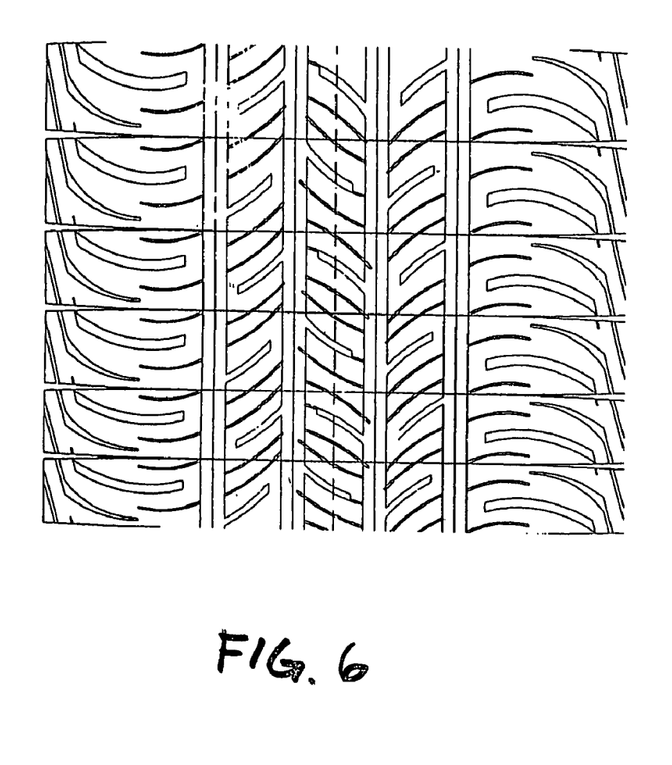
Figure 6A:
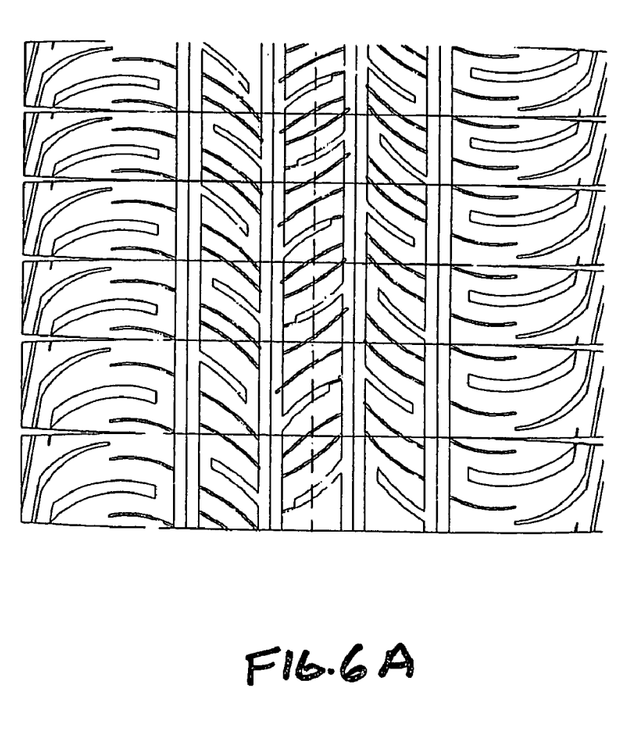
FIG. 6A is a view similar to FIG. 6 illustrating an alternate embodiment of the inventive tire having a reversed tread pattern.
Figure 7:
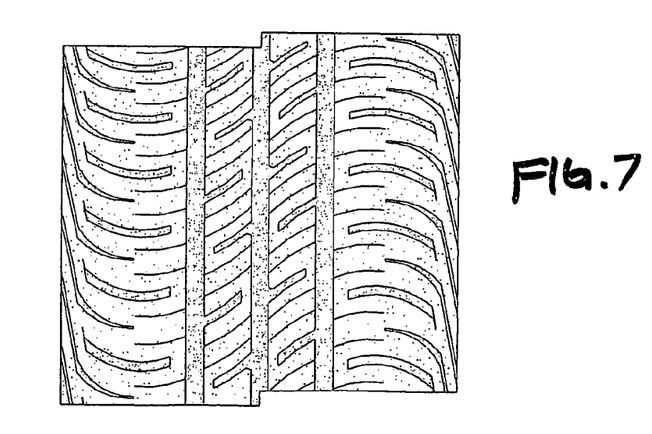
FIGS. 7 and 7A are views similar to FIGS. 1 and 1A showing still another embodiment of the inventive tire.
Figure 7A:
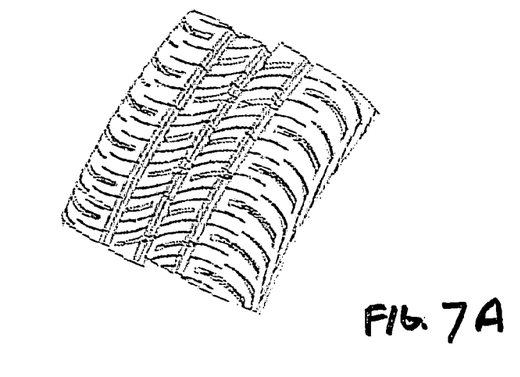

FIG. 6A shows an additional embodiment of the inventive tire in which the lateral grooves and sipes in all five circumferential ribs are configured in a reverse orientation with respect to the orientation shown in FIG. 6, which is a duplicate of FIG. 2. In the embodiment of FIGS. 7 and 7A, central rib 28 in tire 10 has been totally eliminated. This embodiment of the invention is especially appropriate for tires having nominal widths of 195 mm or less, while the embodiment illustrated in FIGS. 1, 1A and 2, is especially appropriate for tires having nominal widths of 205 mm or more.

Figure 8:
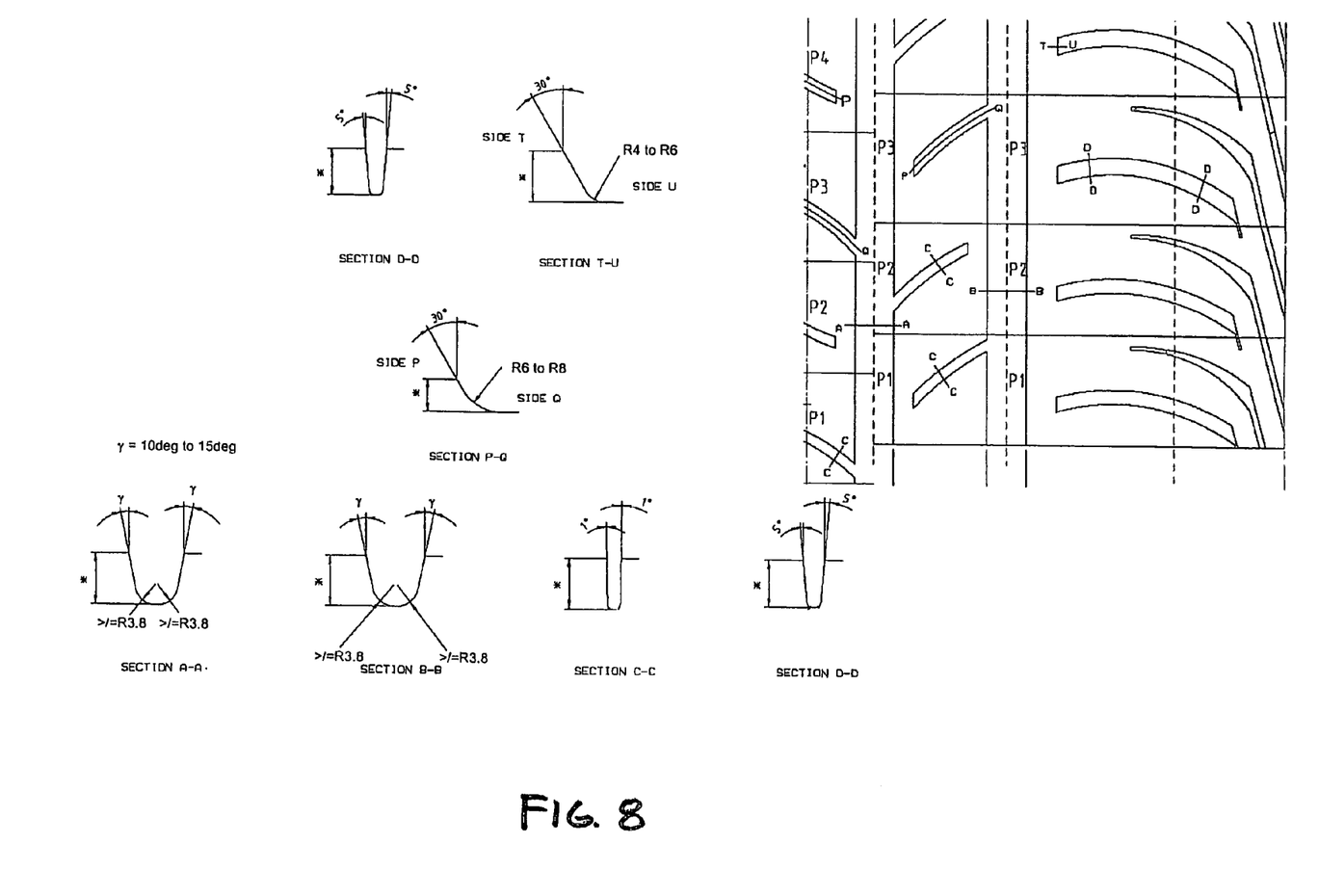
FIG. 8 is a schematic representation showing the details of the groove geometries in the tire illustrated in FIGS. 1, 1A and 2.

Finally, FIG. 8 has been presented to show the details of the groove geometries in the tire illustrated in FIGS. 1, 1A and 2. As can be seen from this figure, the side walls of the lateral grooves in the central and intermediate tread ribs, which are depicted by Section C—C, are arranged at an angle of about 1° with respect to the vertical. Similarly, the side walls of the lateral grooves in the shoulder ribs, which are depicted by Section D—D, are arranged at an angle of about 5° with respect to the vertical. On the other hand, the side walls of the circumferential grooves, which are depicted by Sections A—A and B—B, are arranged at an angle $\gamma$ with respect to the vertical, with angle $\gamma$ varying from about 10° to about 15°. As indicated above, it is desirable that the tread 16 of the tire of FIGS. 1, 1A and 2 have a particular void volume ratio and a particular land-sea area ratio. To deal with this problem, angle $\gamma$ can be changed in tires of different sizes, so that the desired void volume ratio and land-sea area ratio can always be maintained.

Although only a few embodiments of the present invention have been described above, it should be appreciated that many modifications can be made without departing from the spirit and scope of the invention. All such modifications are intended to be included within the scope of the present invention, which is to be limited only by the following claims:

What is claimed is:

1. A pneumatic tire having a tread defining an inner shoulder, an outer shoulder and a tread pattern therebetween, the tread pattern comprising an inner circumferential groove, an outer circumferential groove and at least one intermediate circumferential groove therebetween, the circumferential grooves dividing the tread into four or five circumferential ribs including inner and outer shoulder ribs, inner and outer intermediate ribs between the shoulder ribs and an optional central rib between the intermediate ribs, the inner shoulder rib having inner lateral grooves, each inner lateral groove extending from the inner shoulder toward but not reaching the inner circumferential groove, the inner shoulder rib having multiple sipes which are arranged between adjacent pairs of inner lateral grooves, wherein no lateral groove in the inner shoulder rib reaches the inner circumferential groove, the outer shoulder rib having outer lateral grooves, each outer lateral groove extending from the outer shoulder toward but not reaching the outer circumferential groove, the outer shoulder rib also having multiple sipes which are arranged between adjacent pairs of outer lateral grooves, wherein no lateral groove in the outer shoulder rib reaches the outer circumferential groove, wherein the width of at least one shoulder rib is between about 17% and about 19% of the width of the tread, and further wherein the tread defines a void volume ratio and a land-sea surface area ratio, the land-sea surface area ratio being about 4–8% larger than the void volume ratio, and wherein each circumferential groove is a substantially straight groove having substantially straight edges.

2. The pneumatic tire according to claim 1, wherein the tire includes five circumferential ribs.

3. The pneumatic tire according to claim 1, wherein the tread defines a void volume ratio of about 26.3%±1.0%.

4. The pneumatic tire according to claim 3, wherein the tread defines a void volume ratio of about 26.3%±0.5%.

5. The pneumatic tire according to claim 3, wherein the land-sea surface area ratio of the tread pattern is about 32.0%±1.0%.

6. The pneumatic tire according to claim 5, wherein the land-sea surface area ratio of the tread pattern is about 32.0%±0.5%.

7. The pneumatic tire according to claim 1, wherein the land-sea surface area ratio of the tread pattern is about 32.0%±1.0%.

8. The pneumatic tire according to claim 1, wherein the land-sea surface area ratio of the tread pattern is about 32.0%±0.5%.

9. The pneumatic tire according to claim 1, wherein the sipes in the inner and outer shoulder ribs extend to the inner and outer circumferential grooves, respectively.

10. The pneumatic tire according to claim 1, wherein the width of at least one shoulder rib is between about 17.5% and about 18.5% of the width of the tread.

11. The pneumatic tire according to claim 1, wherein the depth of the lateral grooves in the intermediate ribs and the central rib, if present, is at least one-half of the non-skid depth of the tread.

12. The pneumatic tire according to claim 11, wherein the depth of the lateral grooves in the shoulder ribs is the same as the non-skid depth of the tread.

13. The pneumatic tire according to claim 1, wherein the depth of the lateral grooves in the intermediate ribs and the central rib, if present, extends to or below the tread wear indicator height of the tread.

14. The pneumatic tire according to claim 13, wherein the depth of the lateral grooves in the shoulder ribs is the same as the non-skid depth of the tread.

15. The pneumatic tire according to claim 1, wherein the depth of the lateral grooves in the intermediate ribs and the central rib, if present, is the same as the non-skid depth of the tread.

16. The pneumatic tire according to claim 15, wherein the depth of the lateral grooves in the shoulder ribs is the same as the non-skid depth of the tread.

17. The pneumatic tire according to claim 1, wherein two sipes are positioned between each adjacent pair of lateral grooves in the two shoulder ribs such that, for each pair, the distance between one lateral groove and the adjacent sipe versus the distance between the two sipes versus the distance between the other sipe and the other lateral groove are in a ratio between 25/50/25 and 35/30/35.

18. The pneumatic tire according to claim 17, wherein this ratio is ~30/~40/~30.

19. The pneumatic tire according to claim 1, wherein the optional central and two intermediate ribs each define lateral grooves extending from the circumferential groove on one side of the rib toward but not reaching the circumferential groove on the other side of that rib, with adjacent pairs of these lateral grooves having at least one sipe positioned therebetween.

20. The pneumatic tire according to claim 19, wherein the lateral grooves and adjacent sipes in the two intermediate ribs define a series of U-shaped rib sections.

21. The pneumatic tire according to claim 20, wherein adjacent U-shaped rib sections in each rib face in opposite directions.

22. The pneumatic tire according to claim 21, wherein two sipes are arranged between adjacent pairs of lateral grooves in the two intermediate ribs such tat I-shaped rib sections are defined by these sipes between adjacent U-shaped rib sections.

23. The pneumatic tire according to claim 19, wherein at least some of the lateral grooves and sipes in the optional central and two intermediate ribs are arranged at an acute angle with respect to the circumferential grooves.

24. The pneumatic tire according to claim 23, wherein at least some of the sipes in the central and two intermediate ribs are curved.

25. The pneumatic tire according to claim 24, wherein the curved sipes have a radius of curvature of about 40 mm to about 120 mm.

26. The pneumatic tire according to claim 24, wherein two sipes are arranged between adjacent pairs of lateral grooves in the optional central and two intermediate ribs such tat I-shaped rib sections are defined by these sipes.

27. The pneumatic tire according to claim 26, wherein the tire includes a central rib, and further wherein adjacent sipes in the central rib curve in opposite directions such that some of the I-shaped rib sections in the central rib are larger at their centers than at their tops and bottoms while other I-shaped rib sections are smaller at their centers than at their tops and bottoms.

28. The pneumatic tire according to claim 27, wherein I-shaped rib sections with larger centers alternate with I-shaped rib sections with smaller centers around the circumference of the tire.

29. The pneumatic tire according to claim 26, wherein the sipes defining the I-shaped rib sections in each rib extend between the circumferential grooves on opposite sides of that rib.

30. The pneumatic tire according to claim 24, wherein the curved sipes in the two intermediate ribs define two ends, one of these ends intersecting a circumferential groove at an angle α of about 40–50° and the other of these ends intersecting a circumferential groove at an angle β of about 20–30°.

31. The pneumatic tire according to claim 19, wherein two essentially-parallel curved sipes are arranged between adjacent pairs of lateral grooves in the two intermediate ribs such that I-shaped rib sections are defined by these sipes between adjacent U-shaped rib sections, these lateral grooves and sipes being arranged at an acute angle with respect to the circumferential grooves.

32. The pneumatic tire according to claim 1, wherein the tire has an outside diameter of 690 mm or more and further wherein the lateral grooves, sipes and tread sections defining the tread pattern are arranged in 66–70 repeating pitches having at least three different circumferential lengths for reducing rolling noise of the tire.

33. The pneumatic tire according to claim 1, wherein the tire has an outside diameter of 620–690 mm and further wherein the lateral grooves, sipes and tread sections defining the tread pattern are arranged in 66 repeating pitches having at least three different circumferential lengths for reducing rolling noise of the tire.

* * * * *